United States Patent
Xi et al.

(10) Patent No.: US 9,007,911 B2
(45) Date of Patent: Apr. 14, 2015

(54) METHOD AND SYSTEM FOR IMPLEMENTING DIRECT INTERFACE BETWEEN ACCESS NETWORK NODES

(75) Inventors: Jin Xi, Shenzhen (CN); Shengming Wang, Shenzhen (CN); Feng He, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 333 days.

(21) Appl. No.: 13/697,600

(22) PCT Filed: Mar. 18, 2011

(86) PCT No.: PCT/CN2011/071958
§ 371 (c)(1),
(2), (4) Date: Nov. 13, 2012

(87) PCT Pub. No.: WO2011/157072
PCT Pub. Date: Dec. 22, 2011

(65) Prior Publication Data
US 2013/0064092 A1    Mar. 14, 2013

(30) Foreign Application Priority Data

Jun. 13, 2010 (CN) .......................... 2010 1 0207473

(51) Int. Cl.
*H04W 92/20* (2009.01)
(52) U.S. Cl.
CPC ..................................... *H04W 92/20* (2013.01)
(58) Field of Classification Search
None
See application file for complete search history.

(56) References Cited

U.S. PATENT DOCUMENTS

| | | | |
|---|---|---|---|
| 8,949,997 B2* | 2/2015 | Schmidt et al. ................. | 726/26 |
| 2008/0125126 A1* | 5/2008 | Fang et al. ..................... | 455/436 |
| 2009/0172169 A1* | 7/2009 | Ramaswamy et al. ........ | 709/227 |
| 2010/0278108 A1* | 11/2010 | Cho et al. ...................... | 370/328 |
| 2011/0075563 A1* | 3/2011 | Leung et al. .................. | 370/236 |
| 2011/0176530 A1* | 7/2011 | Vikberg et al. ............... | 370/338 |
| 2011/0237258 A1* | 9/2011 | Nylander et al. ............. | 455/437 |

(Continued)

FOREIGN PATENT DOCUMENTS

| | | |
|---|---|---|
| CN | 101616509 A | 12/2009 |
| CN | 101651592 A | 2/2010 |

(Continued)

OTHER PUBLICATIONS

International Search Report in international application No. PCT/CN2011/071958, mailed on Jun. 23, 2011.

(Continued)

*Primary Examiner* — Phirin Sam
(74) *Attorney, Agent, or Firm* — Oppedahl Patent Law Firm LLC

(57) ABSTRACT

The disclosure provides a method and a system for implementing a direct interface between access network nodes. The method includes: establishing, by an access network node, a direct interface with a proxy node (300); exchanging, by the access network node, information with an access network node managed by the proxy node through the established direct interface (301). By establishing a direct interface between access network nodes and performing a direct interface flow through a proxy node, the disclosure simplifies the establishment and maintenance of the direct interface on the premise that the handover speed is increased and the signaling load of a core network is decreased, thereby reducing the complexity of the establishment and maintenance of the direct interface.

19 Claims, 7 Drawing Sheets

(56) References Cited

U.S. PATENT DOCUMENTS

2012/0002637 A1* 1/2012 Adjakple et al. ............... 370/331
2012/0214445 A1* 8/2012 Stojanovski et al. ......... 455/411
2013/0272268 A1* 10/2013 Xu et al. ....................... 370/331

FOREIGN PATENT DOCUMENTS

| CN | 101674622 A | 3/2010 |
|---|---|---|
| CN | 101686460 A | 3/2010 |
| CN | 101730311 A | 6/2010 |
| EP | 2043404 A1 | 4/2009 |
| WO | 2010030099 A2 | 3/2010 |

OTHER PUBLICATIONS

English Translation of the Written Opinion of the International Search Authority in international application No. PCT/CN2011/071958, mailed on Jun. 23, 2011.

* cited by examiner

METHOD AND SYSTEM FOR IMPLEMENTING DIRECT INTERFACE BETWEEN ACCESS NETWORK NODES

TECHNICAL FIELD

The disclosure relates to technology of communications between access network nodes in a wireless communication system, in particular to a method and a system for implementing a direct interface between access network nodes.

BACKGROUND

A Home (Evolved) NodeB (H(e)NB) is a base station with small size and low power, which is deployed in indoor places such as home and office, with a main purpose of providing a higher service rate for a user and reducing the expense needed by a high-rate service and meanwhile making up for coverage shortage of an existing distributed cellular wireless communication system. The H(e)NB has advantages in affordable price, convenience, low-power output, plug-and-play, etc.

In an H(e)NB system, an H(e)NB user is connected to a core network through a Home (e)NodeB Access Network (H(e)NB AN). FIG. 1 shows a structure diagram of an HeNB in a Long Term Evolution (LTE) system; FIG. 2 shows a structure diagram of an Home NodeB (HNB) in a Universal Mobile Telecommunications System (UMTS); as shown in FIG. 1 and FIG. 2, an H(e)NB AN consists of an (H(e)NB and a Home (e)NodeB Gateway (H(e)NB GW), wherein the H(e)NB GW mainly has the functions of: verifying the security of the H(e)NB, processing the registration and the access control of the H(e)NB, taking charge of data exchange between a core network and the H(e)NB. An H(e)NB Management System (H(e)MS) mainly operates, maintains and manages the H(e)NB, configures and controls the H(e)NB according to the requirement of an operator, and mainly realizes the function of configuring and managing the H(e)NB, including: verifying location information and configuring H(e)NB parameters; wherein the configuration mainly refers to parameter configuration at a Core Network (CN) level, parameter configuration on a Radio Access Network (RAN) side, and parameter configuration of Radio Frequency (RF), etc.

With the development of H(e)NB technology, in order to realize group management of users, there brings a concept of Close Subscriber Group (CSG) and a cell is described with an access mode, wherein the access mode of the cell can be divided into a Closed access mode, a Hybrid access mode and an Open access mode. The three modes are used to describe the cells with a CSG attribute. The cell of the Closed access mode is called a CSG cell, and only users having subscribed with the CSG of the cell can access the CSG cell, while users not subscribing with the CSG of the cell can not access the CSG cell; the cell of the Hybrid access mode is called a Hybrid cell, wherein not only the users having subscribed with the CSG of the cell can access the Hybrid cell, but also the users not subscribing with the CSG of the cell can access the Hybrid cell, however, the users having subscribed with the CSG of the cell are prior to the users not subscribing with the CSG of the cell in terms of the use of resources, and the charge is different too; for the cell of the Open mode, any user can access the cell, and such cell has no difference from a normal macro cell in terms of access control.

The H(e)NB can be deployed in public places, such as school, shopping mall, etc. There may be a plurality of H(e)NBs deployed inside the same enterprise. In order to accelerate a handover speed, a direct interface between H(e)NBs needs to be taken into account. For an enterprise-level scene, the introduction of a direct interface concept is reasonable and necessary, because in this way not only a handover speed is accelerated but also the signaling load of a core network is reduced.

In both a UMTS system and an LTE system, a direct interface can be established between access network nodes (for example, Radio Network Controllers (RNCs) or eNodeBs), wherein the direct interface between eNBs is an X2 interface, and the direct interface between RNCs is an Iur interface. On the premise of meeting the technology requirement, flows such as load balance, information exchange and mobility between base stations can be accomplished more quickly through a direct interface, besides, the signaling overhead of a core network is reduced.

For densely-deployed base stations such as H(e)NBs, since there may be a large number of H(e)NBs which establish direct interfaces and the H(e)NBs have a characteristic of plug and play, the number of direct interfaces between H(e)NBs may become numerous, and the establishment and maintenance of the direct interfaces may become complex. However, the H(e)NB, serving as User Equipment (UE), generally has a low hardware capability out of consideration for cost reduction, and the establishment and maintenance of too many direct interfaces would affect the performance of the H(e)NB.

SUMMARY

In view of the problem above, the main object of the disclosure is to provide a method and a system for implementing a direct interface between access network nodes, with a capability of reducing the complexity of the establishment and maintenance of a direct interface.

In order to achieve the object above, the technical scheme of the disclosure is realized as follows.

A method for implementing a direct interface between access network nodes, including:

establishing, by an access network node, a direct interface with a proxy node;

performing, by the access network node, information exchange with an access network node managed by the proxy node through the established direct interface.

The establishing by an access network node a direct interface with a proxy node may include:

after the access network node passes verification performed by a service management system, configuring, by the service management system, information of the proxy node for the access network node, wherein the information includes transport layer information of the proxy node establishing the direct interface; and establishing, by the access network node, the direct interface with the proxy node using the transport layer information.

The transport layer information may be an IP address of the proxy node, which is used for establishing the direct interface.

The access network node may be an HeNB, the proxy node may be an HeNB GW and the direct interface may be an X2 interface or a newly added direct interface; or, the access network node may be an HNB, the proxy node may be an HNB GW and the direct interface may be an Iur interface or a newly added direct interface.

When cell information of the access network node changes, the information exchange may include:

notifying, by the access network node, the proxy node of changed cell information; and notifying, by the proxy node, other access network nodes managed by the proxy node of the changed cell information obtained.

When the proxy node notifies other access network nodes of the changed cell information, the other access network nodes may refer to: nodes with similar geographic information to that of the access network node, or nodes with a same CSG attribute, or nodes with similar geographic information and a same CSG attribute.

The method may further include:

after the other access network nodes obtaining the changed cell information update successfully, responding, by the other access network nodes, the access network node with an update success through the proxy node.

When the access network node terminates a service, the information exchange may include:

after the proxy node detects a disconnection from the access network node through underlying link protection, instructing, by the proxy node, other access network nodes managed by the proxy node itself to delete stored cell information of the access network node; and after the other access network nodes managed by the proxy node delete the stored cell information successfully, responding, by the other access network nodes, the proxy node with a deletion success.

When UE accessing the access network node needs to perform handover, the information exchange may include:

when the access network node determines that a target cell to which the UE is to be switched is a serving cell of the proxy node, requesting, by the access network node, handover from the proxy node through the direct interface;

reallocating, by the proxy node, a signaling connection identifier to the UE, and sending, by the proxy node, a handover request to a target access network node where the target cell is located through the direct interface; and returning, by the target access network node, a handover response to the access network node where the handover occurs via the proxy node through the direct interface.

When the UE accessing the access network node needs to perform handover, the information exchange may further include:

notifying, by the target access network node, a core network to update information of a user plane channel and information of an access network element, and notifying, by the target access network node, the access network node where the handover occurs to release a context of the UE through the proxy node.

When the access network node needs to perform load balance, the information exchanges may include:

requesting, by the access network node, reporting of cell resources from the proxy node through the direct interface;

after the proxy node determines a corresponding access network node to which a cell to be reported belongs, forwarding, by the proxy node, a resource status request to the corresponding access network node through the direct interface; and returning, by the proxy node, resource conditions of each cell to the access network node through the direct interface.

A system for implementing a direct interface between access network nodes, at least comprising a proxy node, and one or more access network nodes; wherein the access network node is configured to establish a direct interface with the proxy node and to exchange information with an access network node managed by the proxy node through the established direct interface.

The system may further include a service management system;

the access network node may be configured to establish the direct interface with the proxy node using obtained transport layer information; and the service management system may be configured to verify the access network node and to configure information of the proxy node for the access network node, wherein the information includes transport layer information of the proxy node establishing the direct interface.

When cell information of the access network node changes, the access network node may be configured to notify the proxy node of changed cell information; and the proxy node may be configured to notify other access network nodes managed by the proxy node of the changed cell information obtained.

The other access network nodes obtaining the changed cell information may be further configured, after a successful update, to respond the access network node with an update success through the proxy node.

When the proxy node notifies other access network nodes of obtained changed information of the access network node, the other access network nodes may refer to:

nodes with similar geographic information to that of the access network node, or nodes with a same CSG attribute, or nodes with similar geographic information and a same CSG attribute.

When the access network node terminates a service, the proxy node may be configured, after detecting a disconnection from the access network node through underlying link protection, to instruct other access network nodes managed by the proxy node itself to delete stored cell information of the access network node; and the other access network nodes managed by the proxy node may be configured, after deleting the stored cell information successfully, to respond the proxy node with a deletion success.

when UE accessing the access network node needs to perform handover, the access network node may be configured, when determining that a target cell to which the UE is to be switched is a serving cell of the proxy node, to request handover from the proxy node through the direct interface;

the proxy node may be configured to reallocate a signaling connection identifier to the UE and to send a handover request to a target access network node where the target cell is located through the direct interface; and the target access network node is configured to return a handover response to the access network node where the handover occurs via the proxy node through the direct interface.

When the UE accessing the access network node needs to perform handover, the target access network node may be further configured to notify a core network to update information of a user plane channel and information of an access network element and to notify, through the proxy node, the access network node where the handover occurs to release a context of the UE.

When the access network node needs to perform load balance, the access network node may be configured to, through the direct interface, request reporting of cell resources from the proxy node; and the proxy node may be configured, after determining a corresponding access network node to which a cell to be reported belongs, to forward a resource status request to the corresponding access network node through the direct interface, and to return resource conditions of each cell to the access network node through the direct interface.

The access network node may be an HeNB, the proxy node may be an HeNB GW and the direct interface may be an X2 interface or a newly added direct interface; or, the access network node may be an HNB, the proxy node may be an HNB GW and the direct interface may be an Iur interface or a newly added direct interface.

It can be seen from the technical scheme provided in this disclosure that: a direct interface is established between an access network node and a proxy node; the access network node exchanges information with an access network node managed by the proxy node through the established direct interface. By establishing a direct interface between access network nodes and executing a direct interface flow by a proxy node, the disclosure simplifies the establishment and maintenance of the direct interface on the premise that the handover speed is increased and the signaling load of the core network is decreased, thereby reducing the complexity of the establishment and maintenance of the direct interface.

DETAILED DESCRIPTION

Figure 1:
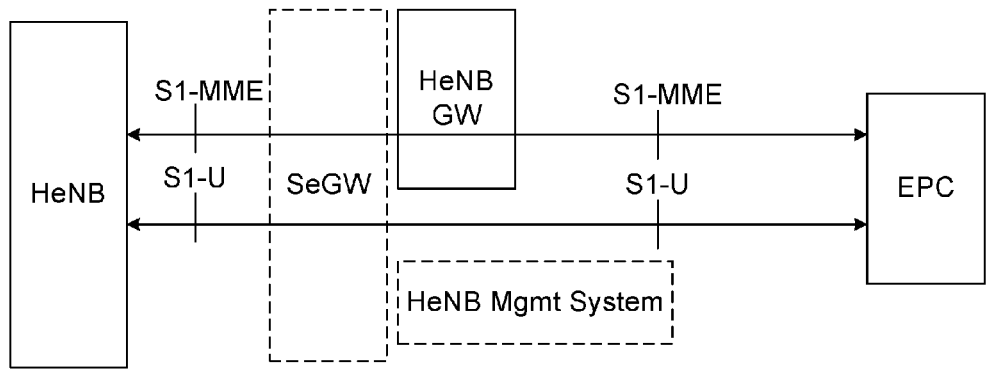
FIG. 1 shows a diagram of a network architecture of an HeNB in an existing LTE system.
Figure 2:
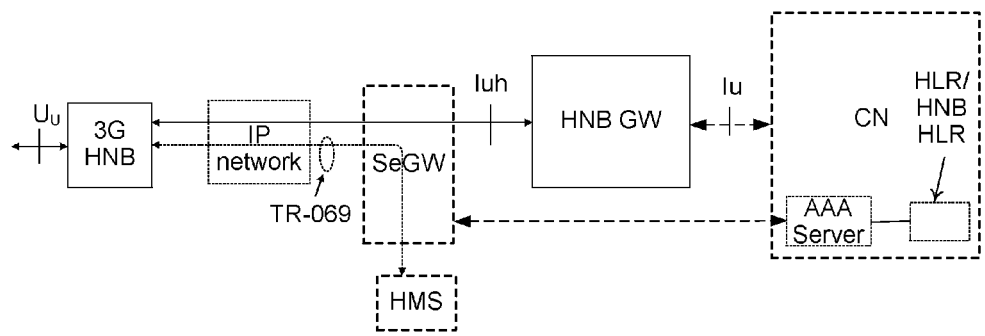
FIG. 2 shows a diagram of a network architecture of an HNB in an existing UMTS system.
Figure 3:
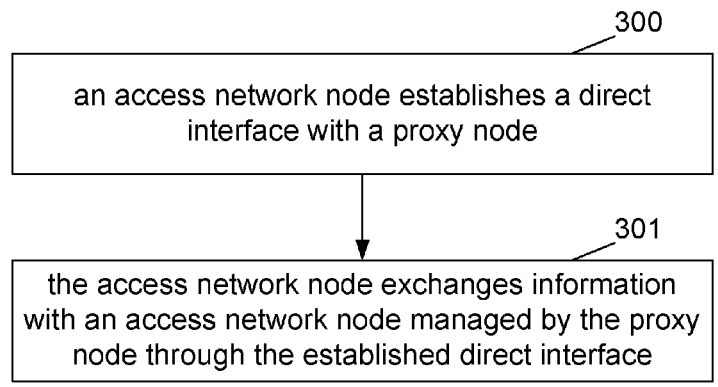
FIG. 3 shows a flowchart of a method for implementing a direct interface between access network nodes according to the disclosure.

FIG. 3 shows a flowchart of a method for implementing a direct interface between access network nodes according to the disclosure; as shown in FIG. 3, the method includes the following steps.

Step 300: an access network node establishes a direct interface with a proxy node. Here, the proxy node refers to an HeNB GW, and an access network node managed by the proxy node exchanges information with a core network through the proxy node.

The step that an access network node establishes a direct interface with a proxy node includes: after the access network node passes the verification performed by a service management system, the service management system configures information of the proxy node for the access network node, wherein the information includes transport layer information of the proxy node establishing the direct interface; and the access network node establishes the direct interface with the proxy node using the transport layer information.

The emphasis of Step 300 is that an access network node establishes a direct interface with a proxy node, instead of establishing a direct interface with other access network nodes directly. In this way, an interface is maintained by a proxy node, thus the signaling interaction during the establishment and maintenance of the interface is reduced and the complexity of the maintenance of the interface is reduced.

Step 301: the access network node exchanges information with an access network node managed by the proxy node through the established direct interface.

A certain access network node establishes a direct interface with the proxy node, and the proxy node feeds back information of other access network nodes managed by the proxy node to the access network node as information of the proxy node itself; in this way, the access network node would consider that a direct interface exists between the access network node itself and other access network nodes managed by the proxy node. Here, the other access network nodes managed by the proxy node refer to the access network nodes establishing a direct interface with the proxy node.

The information exchange in Step 301 specifically includes:

when cell information of the access network node changes, the information exchange includes: the access network node notifies the proxy node of changed cell information; the proxy node notifies other access network nodes managed by the proxy node of the obtained changed cell information as information of a serving cell. After the access network nodes obtaining the changed cell information make an update successfully, the access network nodes respond the access network node with an update success through the proxy node.

When the proxy node notifies other access network nodes of the obtained changed information of the access network node, the proxy node is notified that the other access network nodes can be nodes with similar geographic information to that of the access network node with information changed, or nodes with the same CSG attribute, or nodes with similar geographic information and the same CSG attribute. Here, the same CSG attribute refers to: the same CSG identification (ID) and access mode, or the same CSG ID.

When the access network node terminates a service, the information exchange includes: after the proxy node detects a disconnection from the access network node through underlying link protection, the proxy node instructs other access network nodes managed by the proxy node itself to delete stored cell information of the access network node; after the other access network nodes managed by the proxy node delete the stored cell information successfully, the other access network nodes responds the proxy node with a deletion success.

When UE accessing the access network node needs to perform handover, the information exchange includes: when the access network node determines that a target cell to which the UE is to be switched is a serving cell of the proxy node, it requests handover from the proxy node through the direct interface; the proxy node reallocates a signaling connection identifier to the UE, and sends a handover request to a target access network node where the target cell is located through the direct interface; the target access network node returns a handover response to the source access network node where the handover occurs via the proxy node through the direct interface.

When the UE accessing the access network node needs to perform handover, the information exchange further includes:

the target access network node notifies a core network to update information of a user plane channel and information of an access network element, and notifies the source access network node to release a context of the UE through the proxy node.

When the access network node needs to perform load balance, the information exchanges includes: the access network node requests reporting of cell resources from the proxy node through the direct interface; after the proxy node determines a corresponding access network node to which a cell to be reported belongs, the proxy node forwards a resource status request to the corresponding access network node through the direct interface, and returns resource conditions of each cell to the access network node through the direct interface.

Provided that an access network node A and an access network node C establish direct interfaces with a proxy node B respectively, then the access network node A can exchange information with other access network nodes managed by the access network node B, such as the access network node C, through a direct interface connected with the proxy node B; on the other hand, the access network node C also can exchange information with the access network node A through a direct interface connected with the proxy node B. For example, the access network node A executes a direct interface flow, which may include handover, load interaction and so on, with the access network node C through the direct interface between the proxy node B and the access network node A; the direct interface flow initiated by the access network node A is terminated at the proxy node B, while the proxy node B determines the real termination point of the flow, such as the access network node C, according to information such as a cell ID in the flow, and continues to initiate a direct interface flow aiming at the access network node C. During this process, the proxy node B also performs the allocation and replacement of signaling connection identifiers on two ends of the direct interface.

Specifically, provided that the access network node A and the access network node C are respectively connected with the proxy node B simultaneously; the proxy node B establishes a direct interface with the access network node A and feeds back information of other access network nodes as the information of the proxy node itself to the access network node A, to make the access network node A consider that direct interfaces exist between the access network node A itself and the other access network nodes. When executing a flow on the direct interface (for example, handover from the access network node A to the access network node C), the proxy node B receives and parses a flow signaling (for example, handover preparation initiated by the access network node A), determines the real termination point of the flow (for example, the access network node C) and initiates this flow aiming at the real termination point in its own name.

In addition, further, the proxy node B may select all access network nodes managed by the proxy node B itself to exchange information with the access network node A, also may select part of the access network nodes to exchange information with the access network node A according to location information of the access network node A; and furthermore, it is likely that the access network node A specifies an access network node to exchange information with the access network node A.

An HeNB system is taken as an example; an access network node is an HeNB and a proxy node is an HeNB GW. A direct interface can be an X2 interface or a newly added direct interface in an LTE HeNB system, or can be an Iur interface or a newly added direct interface in a UMTS HNB system.

It should be noted that the present disclosure is not limited to be applied in the HeNB system, and the access network node also can be a relay node or a common base station; the proxy node can be a host base station of a relay node, or an access network element located between a common macro base station and a core network.

For a better understanding of the disclosure, embodiments are provided below for detailed illustration. In the embodiment, an HeNB system is taken for example, an HeNB GW serves as a proxy node and a direct interface is established between HeNBs. In the embodiment described below, a conventional direct interface name is adopted; a direct interface between HeNBs in an LTE system is called an X2 interface and a direct interface between HeNBs in a UMTS system is called an Iur interface.

Figure 4:
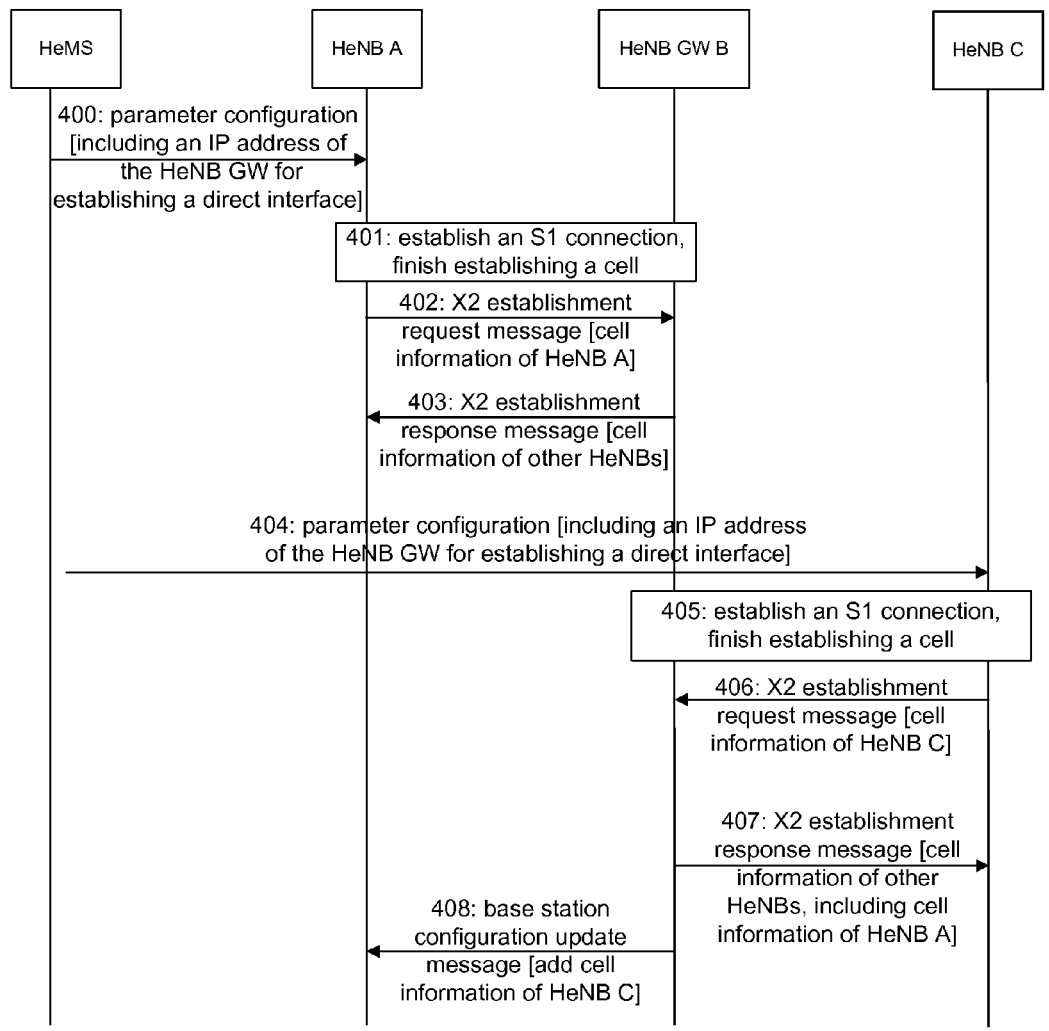
FIG. 4 shows a flowchart of an embodiment for establishing a direct interface between HeNBs through an HeNB GW according to the disclosure.

FIG. 4 shows a flowchart of an embodiment for establishing a direct interface between HeNBs through an HeNB GW according to the disclosure, wherein the access network nodes are HeNB A and HeNB C respectively, and the HeNB A and HeNB C are connected to an Mobility Management Entity (MME) through an HeNB GW B; as shown in FIG. 4, the flow includes the following steps.

Step 400: the HeNB A selects a service management system (HeMS); after the HeMS verifies that a service can be provided for the HeNB A, the HeMS configures necessary parameters for the HeNB A, the configured parameters including a cell identification (ID) and a Physical Cell Identification (PCI) of the HeNB A, and so on; meanwhile the HeMS specifies information of the HeNB GW B with which the HeNB A is needed to be connected for the HeNB A, for example, an IP address of the HeNB GW B which is used for establishing an S1 interface, and etc. If the HeNB A can establish a direct interface with the HeNB GW B, the HeMS needs to configure transport layer information needed to establish a direct interface at the same time, for example, an IP address of the HeNB GW B, which is used for establishing an X2 interface.

In this embodiment, when the HeMS configures parameters for the HeNB A, the HeMS simultaneously configures the transport layer information needed to establish a direct interface, for example, the IP address of the HeNB GW B, which is used for establishing an X2 interface.

In Step 400, the judgment on whether the HeNB A and the HeNB GW B can establish a direct interface can be made based on whether the support version and the capability of the HeNB A or the HeNB GW are consistent; the specific implementation belongs to technical means commonly used by those skilled in the art, thus no detailed description is repeated here.

Step 401: the HeNB A establishes an S1 connection with the HeNB GW B, to notify the HeNB GW B of information such as the ID of the HeNB A and the cell ID; after the S1 interface is established successfully, the HeNB A establishes a cell to provide service for UE.

Step 402: the HeNB A establishes a Stream Control Transmission Protocol (SCTP) connection with the HeNB GW B according to the IP address of the HeNB GW B, which is used for establishing an X2 interface obtained in Step 400, and sends an X2 establishment request message to the HeNB GW B.

In Step 402, information of a serving cell, which is included in the X2 establishment request message, is information of a cell established by the HeNB A, for example, a PCI, a Cell ID, frequency information in a Frequency Division Duplex (FDD) mode, a frame format in a Time Division Duplex (TDD) mode, antenna port information, and etc; if the cell has a CSG attribute, the information of the serving cell can further include the CSG ID and the access mode of the cell; the information of the serving cell also can include neighboring cell information of the serving cell and geographical information of the HeNB A.

Step 403: after receiving the X2 establishment request message, the HeNB GW B judges whether it is needed to establish an X2 direct interface with the HeNB A; if the X2 direct interface can not be established through a proxy, the HeNB GW B returns an X2 establishment failure message with a cause value which indicates the proxy X2 interface is not supported. After receiving the failure message, the HeNB A gives up establishing a direct interface with the HeNB GW B, subsequently adopts a related art to establish a non-proxy-mode direct interface with a neighboring base station or the HeNB.

If the HeNB GW B determines that it can establish an X2 direct interface with the HeNB A, the HeNB GW B returns an X2 establishment response message, and optionally returns information of all managed HeNB cells to the HeNB A through a serving cell information option in the X2 establishment response message; or the HeNB GW B returns information of a cell established by a neighboring base station or an HeNB to the HeNB A after determining a neighboring base station or an HeNB of the HeNB A according to the geographical information and the CSG attribute of the HeNB A.

In Step 403, after receiving the X2 establishment response message, the HeNB GW B judges whether it is needed to establish an X2 direct interface with the HeNB A, wherein the judgment can be made based on resource conditions of the HeNB GW at that time; the specific implementation belongs to common-used technical means for those skilled in the art, thus no detailed description is given here.

Step 404: provided that the HeNB C is electrified and started after a direct interface is established between the HeNB A and the HeNB GW B, wherein the geographical location of the HeNB C is adjacent to that of the HeNB A. The HeNB C selects an HeMS; after the HeMS verifies that a service can be provided for the HeNB C, the HeMS configures necessary parameters for the HeNB C, the configured parameters including a cell ID and a PCI of the HeNB C, and so on; meanwhile the HeMS specifies information of the HeNB GW B with which the HeNB C is needed to be connected for the HeNB C, for example, an IP address of the HeNB GW B, which is used for establishing an S1 interface. If the HeNB C can establish a direct interface with the HeNB GW B, the HeMS needs to configure transport layer information needed to establish a direct interface at the same time, for example, the IP address of the HeNB GW B, which is used for establishing an X2 interface.

In this embodiment, when the HeMS configures parameters for the HeNB C, the HeMS simultaneously configures transport layer information needed to establish a direct interface, for example, the IP address of the HeNB GW B, which is used for establishing an X2 interface.

Step 405: the HeNB C establishes an S1 connection with the HeNB GW B, and notifies the HeNB GW B of information such as the ID of the HeNB C and a cell ID; after the S1 interface is established successfully, the HeNB B establishes a cell to provide service for UE.

Step 406: the HeNB C establishes an SCTP connection with the HeNB GW B according to the IP address of the HeNB GW B used for establishing an X2 interface obtained in Step 404, and sends an X2 establishment request message to the HeNB GW B.

Information of a serving cell, which is included in the X2 establishment request message, is information of a cell established by the HeNB C, and further includes geographical information of the HeNB C itself.

Step 407: after receiving the X2 establishment request message, the HeNB GW B judges whether it is needed to establish an X2 direct interface with the HeNB C; if the X2 direct interface can not be established through a proxy, the HeNB GW B returns an X2 establishment failure message with a cause value which indicates that a proxy X2 interface is not supported. After receiving the failure message, the HeNB C gives up establishing a direct interface with the HeNB GW B, subsequently adopts a related art to establish a non-proxy mode direct interface with a neighboring base station or an HeNB.

If the HeNB GW B determines that it can establish an X2 direct interface with the HeNB C, the HeNB GW B returns an X2 establishment response message; since the geographical location of the HeNB A is adjacent to that of the HeNB C, in the X2 establishment response message, the HeNB GW B returns the information of the cell established by the HeNB A obtained in Step 403 to the HeNB C as the information of the serving cell of the HeNB GW B itself; the X2 establishment response message can further include information of all HeNB cells managed by the HeNB GW B, or information of other neighboring cells selected according to the geographical information of the HeNB C.

Step 408: the HeNB GW B sends a base station configuration update message (ENB CONFIGURATION UPDATE) to the HeNB A, to notify the HeNB A to add information of the cell established by the HeNB C which is the serving cell managed by the HeNB GW.

Through the flow shown in FIG. 4, the establishment process of a direct interface between the HeNB A and the HeNB C is completed.

Figure 5:
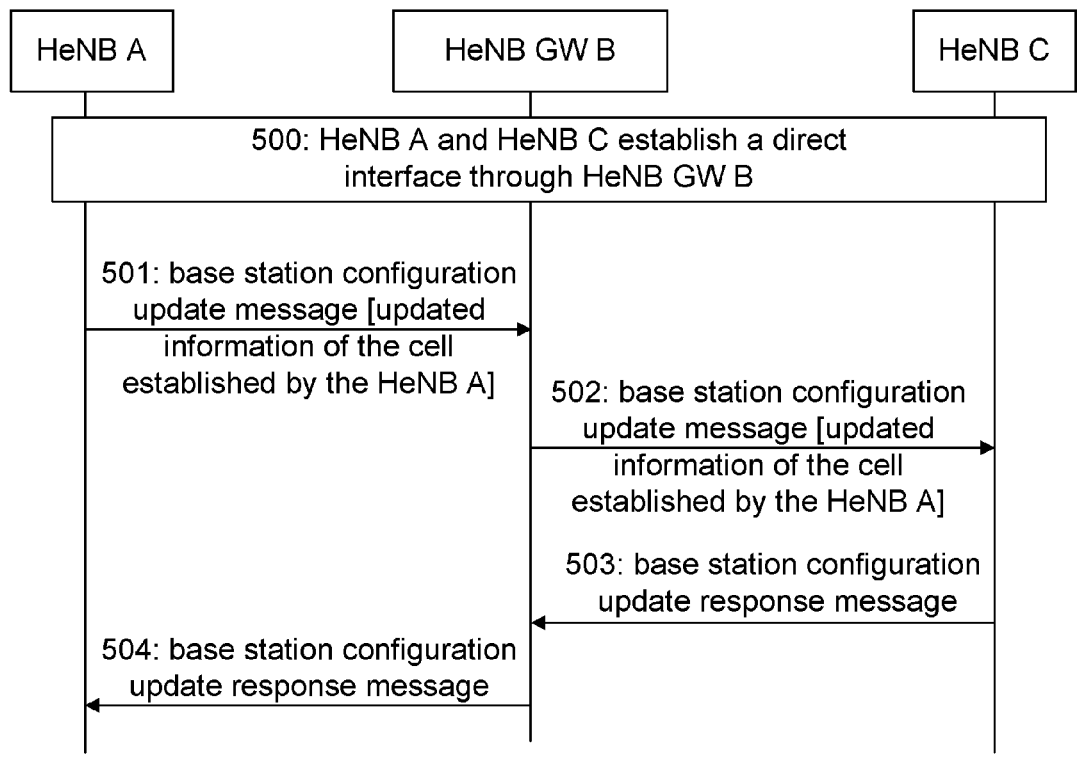
FIG. 5 shows a flowchart of an embodiment for updating a direct interface between HeNBs according to the disclosure.

FIG. 5 shows a flowchart of an embodiment for updating a direct interface between HeNBs according to the disclosure; in the embodiment, the access network nodes are HeNB A and HeNB C respectively, and the HeNB A and HeNB C are connected to an MME through an HeNB GW B; an update flow of information maintenance between the HeNB A and the HeNB C is as shown in FIG. 5, including the following steps.

Step 500: the steps shown in FIG. 4 are applied; and the HeNB A and the HeNB C establish a direct interface through the HeNB GW B.

Step 501: in this embodiment, provided that information of a cell established by the HeNB A changes, for example, an E-UTRAN Cell Global Identification (ECGI) or a PCI or an E-UTRA Absolute Radio Frequency Channel Number (EARFCN) of the cell and other information changes, then the HeNB A notifies the HeNB GW B through a base station configuration update message (ENB CONFIGURATION UPDATE).

Step 502: the HeNB GW B determines that it is needed to notify the HeNB C of the information of the HeNB A, wherein the determination can be made based on whether the HeNB C has similar geographical information to that of the HeNB A. The HeNB GW B sends the HeNB C an ENB CONFIGURATION UPDATE message which includes updated information of the cell established the HeNB A, wherein the updated information is obtained by updating the information of the serving cell of the HeNB GW B itself.

Step 503: after receiving the ENB CONFIGURATION UPDATE message, the HeNB C updates information of the direct interface between the HeNB C itself and the HeNB GW B according to the content in the message; if the update succeeds, the HeNB C returns a base station configuration update response (ENB CONFIGURATION UPDATE ACKNOWLEDGE) message to the HeNB GW B; otherwise, the HeNB C returns a base station configuration update failure (ENB CONFIGURATION UPDATE FAILURE) message.

Step 504: if the update performed by the HeNB C succeeds, the HeNB GW B returns a base station configuration update response (ENB CONFIGURATION UPDATE ACKNOWLEDGE) message to the HeNB A; otherwise, the HeNB GW B returns a base station configuration update failure (ENB CONFIGURATION UPDATE FAILURE) message.

Through the steps shown in FIG. 5, the update flow of direct interface information is completed.

Figure 6:
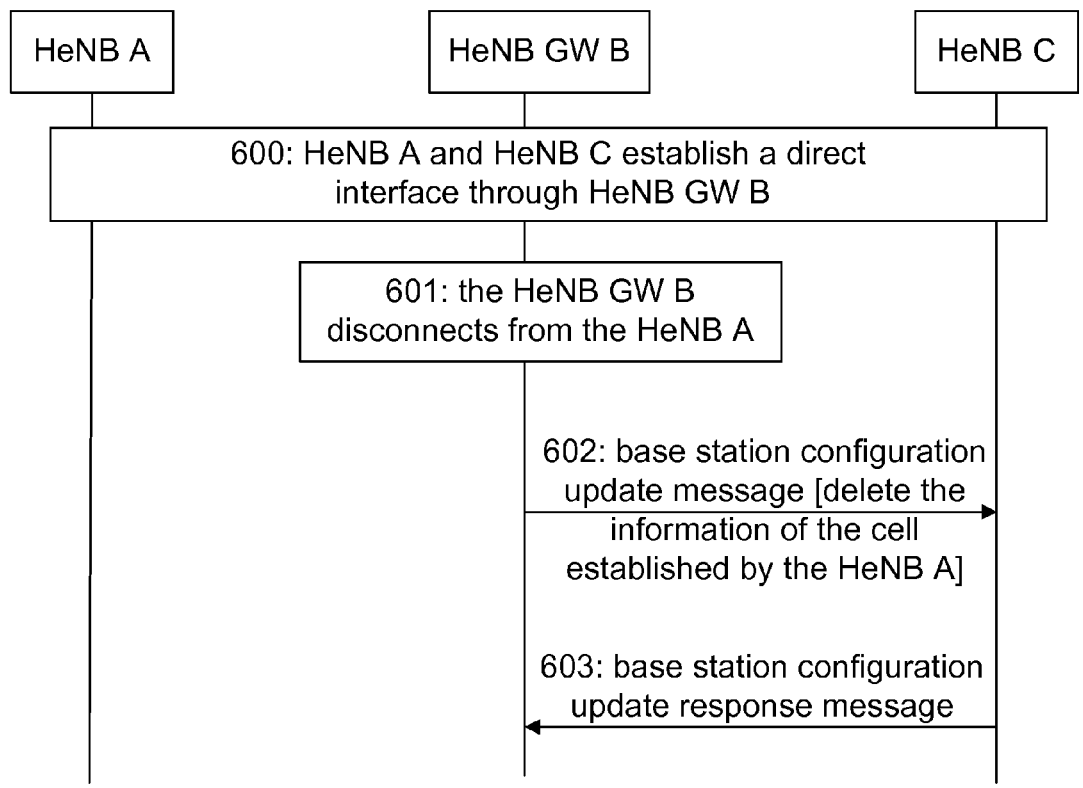
FIG. 6 shows a flowchart of an embodiment for deleting a direct interface between HeNBs according to the disclosure.

FIG. 6 shows a flowchart of an embodiment for deleting a direct interface between HeNBs according to the disclosure; in the embodiment, provided that access network nodes are HeNB A and HeNB C respectively, and the HeNB A and HeNB C are connected to an MME through an HeNB GW B; as shown in FIG. 6, the flow includes the following steps.

Step 600: the steps shown in FIG. 4 are applied; and the HeNB A and the HeNB C establish a direct interface through the HeNB GW B.

Step 601: in this embodiment, provided after a period of time the HeNB A terminates a service, for example, being offline or powered down. Through underlying link protection, the HeNB GW B detects a disconnection from the HeNB A. In this step, how to detect the disconnection from the HeNB A belongs to technical means commonly used by those skilled in the art, thus no detailed description is given here.

Step 602: the HeNB GW B instructs the HeNB C through an ENB CONFIGURATION UPDATE message to delete information of a cell established by the HeNB A.

Step 603: after receiving the ENB CONFIGURATION UPDATE message, the HeNB C updates information of a direct interface between the HeNB C itself and the HeNB GW B according to the content included in the message; if the update succeeds, the HeNB C returns a base station configuration update response (ENB CONFIGURATION UPDATE ACKNOWLEDGE) message to the HeNB GW B; otherwise, the HeNB C returns a base station configuration update failure (ENB CONFIGURATION UPDATE FAILURE) message.

Through the steps shown in FIG. 6, the flow of deleting direct interface information is completed.

Figure 7:
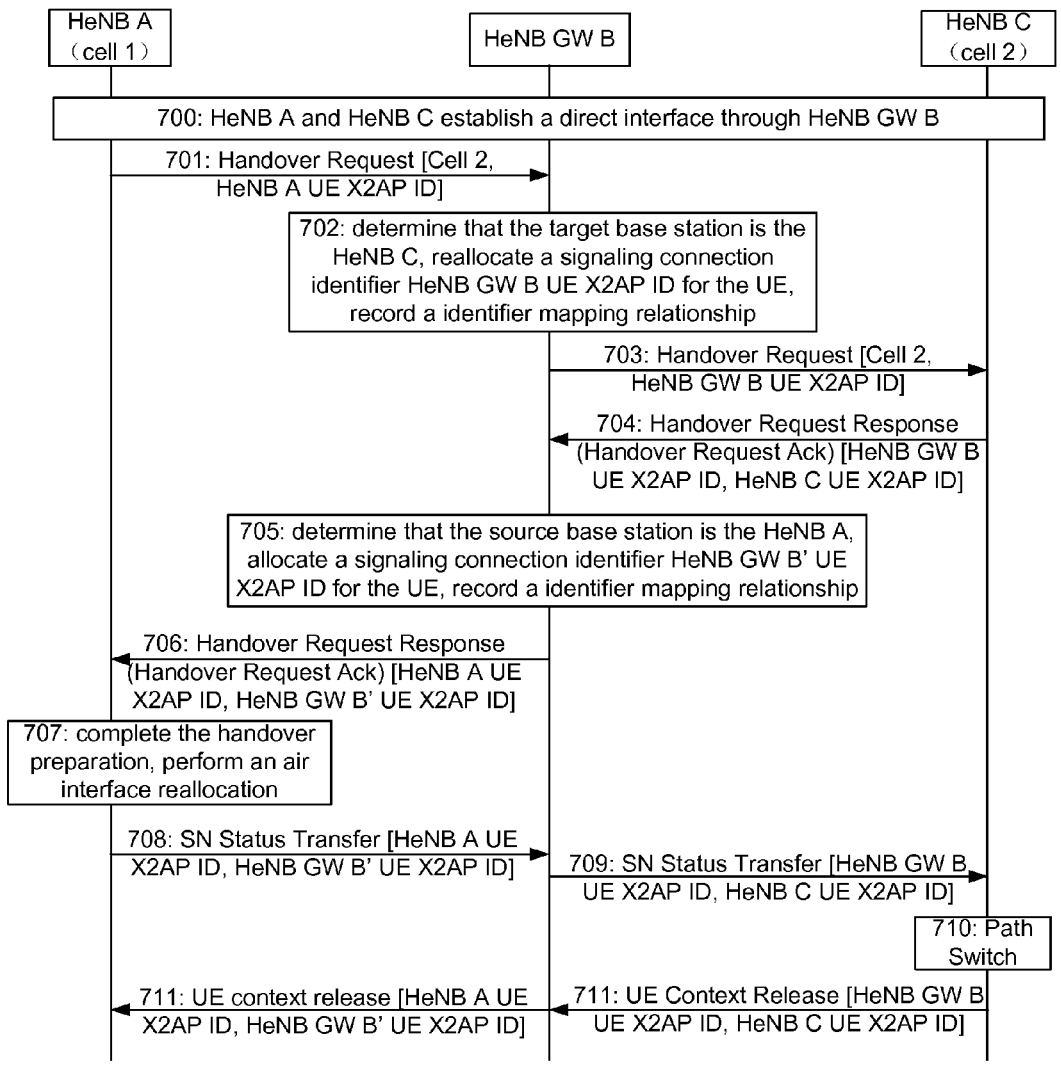
FIG. 7 shows a diagram of executing a dedicated UE flow between HeNB direct interfaces through an HeNB GW according to the disclosure.

FIG. 7 shows a diagram of executing a dedicated UE flow between HeNB direct interfaces through an HeNB GW according to the disclosure; in this embodiment, provided access network nodes are HeNB A and HeNB C respectively, and the HeNB A and HeNB C are connected to an MME through an HeNB GW B; Cell 1 established by the HeNB A and Cell 2 established by the HeNB C are neighboring cells. As shown in FIG. 7, the flow includes the following steps.

Step 700: the steps shown in FIG. 4 are applied; the HeNB A and the HeNB C establish a direct interface through the HeNB GW B, moreover the HeNB A records the Cell 2 as a serving cell of the HeNB GW B, and the HeNB C records the Cell 1 as a serving cell of the HeNB GW B.

Step 701: provided that UE accesses the Cell1 established by the HeNB A and is in a connection status. Due to the changes in mobility or wireless signals or the like, the HeNB A needs to switch the UE to a target cell Cell 2.

According to the stored content in Step 700, the HeNB A determines that the Cell 2 is the serving cell of the HeNB GW B, sends a Handover Request message to the HeNB GW B through the direct interface and includes the ID of Cell 2, which is a target cell ID, in the Handover Request message, and allocates a signal connection identifier of the UE on this direct interface, for example, an HeNB A UE X2AP ID.

Step 702: after receiving the Handover Request message from an HeNB A direct interface, the HeNB GW B determines that a target base station is the HeNB C, according to the target cell ID, that is, the ID of the Cell 2, included in the Handover Request message and according to the information obtained when the HeNB C establishes S1 and X2 interfaces with the HeNB GW B itself in Step 700; the HeNB GW B reallocates a signaling connection identifier such as an HeNB GW B UE X2AP ID for the UE, and records the HeNB A UE X2AP ID and a mapping relationship between the HeNB A and the HeNB GW B UE X2AP ID.

Step 703: the HeNB GW B sends a Handover Request message to the HeNB C through a direct interface by which the HeNB GW B is connected with the HeNB C and includes the ID of the Cell 2, which is the target cell ID, in the Handover Request message; and the HeNB GW B UE X2AP ID is a signaling connection identifier of a source base station.

Step 704: after receiving the Handover Request message from an HeNB GW B direct interface, the HeNB C allocates resources. If the HeNB C allows handover of UE, the HeNB C returns a Handover Request Ack message to the HeNB GW B, wherein the message includes the HeNB GW B UE X2AP ID allocated in Step 802 which is the signaling connection identifier of the source base station and the HeNB C UE X2AP ID allocated by the HeNB C which is the signaling connection identifier of the target base station.

Step 705: after receiving the Handover Request Ack message from the HeNB C direct interface, the HeNB GW B is mapped to the HeNB A UE X2AP ID, according to the signaling connection identifier of the source base station in the message, that is, the HeNB GW B UE X2AP ID, and thus determines that the HeNB which initiates the handover is the HeNB A.

The HeNB GW B allocates a signaling identifier, i.e. an HeNB GW B' UE X2AP ID for the UE, wherein this identifier can be the same as or different from the HeNB GW B UE X2AP ID allocated in Step 702. At this moment, the HeNB GW B saves a mapping relationship between the two groups of signaling identifiers: (HeNB A UE X2AP ID, HeNB GW B' UE X2AP ID), which is used to identify dedicated signaling connection of UE on the direct interface between the HeNB A and the HeNB GW B; and (HeNB GW B UE X2AP ID, HeNB C UE X2AP ID), which is used to identify dedicated signaling connection of UE on the direct interface between the HeNB C and the HeNB GW B.

Step 706: the HeNB GW B sends a Handover Request Ack message to the HeNB A, including the HeNB A UE X2AP ID which is the signaling connection identifier of the source base station and the HeNB GW B' UE X2AP ID which is the signaling connection identifier of the target base station.

Step 707: after receiving the Handover Request Ack message from the HeNB GW B, the HeNB A finishes the handover preparation process, and performs a reallocation process at an air interface.

Step 708: the HeNB A notifies the HeNB GW B of Packet Data Convergence Protocol (PDCP) sequence number information through an SN Status Transfer signaling, including the HeNB A UE X2AP ID which is the signaling connection identifier of the source base station and the HeNB GW B' UE X2AP ID which is the signaling connection identifier allocated by the target base station.

Step 709: the HeNB GW B is mapped to (HeNB GW B UE X2AP ID, HeNB C UE X2AP ID) according to the signaling connection identifier (HeNB GW B UE X2AP ID, HeNB C UE X2AP ID), and forwards a message to the HeNB C after replacement with an identifier to be mapped to.

Step 710: the HeNB C notifies a core network to update information of a user plane channel and information of an access network element through a Patch Switch signaling.

Step 711: the HeNB C sends a UE Context Release message to the HeNB GW B; through a method similar to Step 708 and Step 709, the HeNB GW B forwards the message to the HeNB A. The HeNB A releases the context of the UE and completes the handover process.

FIG. 7 illustrates the flow for finishing a handover preparation process using a direct interface. For other UE-related direct interface flows initiated from the source HeNB, the HeNB GW B needs to determine a target HeNB of the flow and a target HeNB according to cell information or a terminal signaling connection number in a message and forwards the message to the target HeNB. The specific implementation is easy to perform for those skilled in the art on the basis of the description above, thus no detailed description is needed here.

Figure 8:
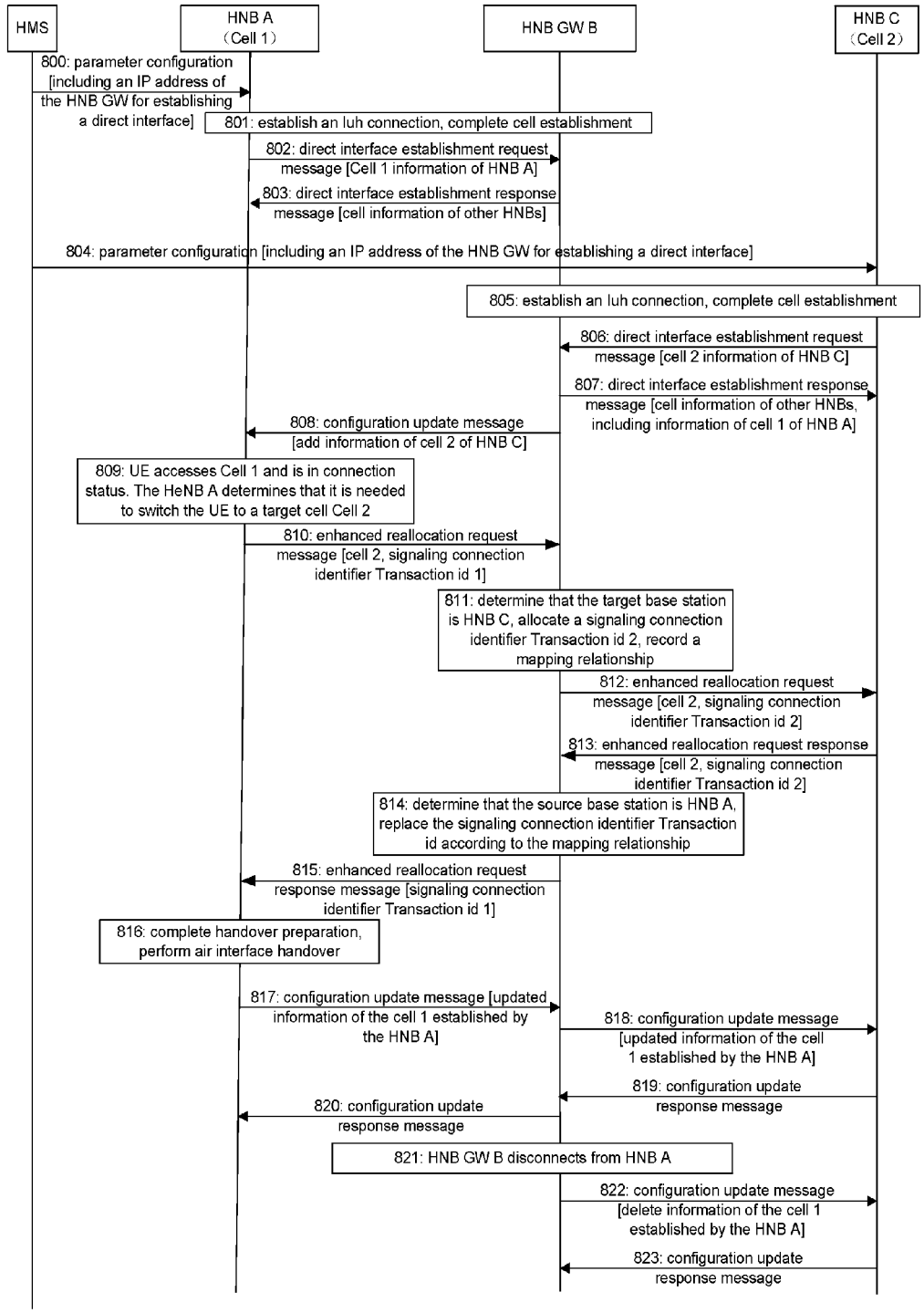
FIG. 8 shows a flowchart of an embodiment for establishing a direct interface between HNBs, updating a direct interface between HNBs and deleting a direct interface between HNBs through an HNB GW according to the disclosure.

FIG. 8 shows a flowchart of an embodiment for establishing a direct interface between HNBs, updating a direct interface between HNBs and deleting a direct interface between HNBs through an HNB GW according to the disclosure; in the embodiment, provided that access network nodes are HNB A and HNB C respectively, and the HNB A and the HNB C are connected to a CN through an HNB GW B; Cell 1 established by the HNB A and Cell 2 established by the HNB C are neighboring cells. As shown in FIG. 8, the flow includes the following steps:

wherein Step 800 to Step 808 are similar to the steps shown in FIG. 4, only the network element type and the interface message are different. Through Step 800 to Step 808, the establishment of a direct interface between the HNB A and HNB C is completed; the HNB A records the Cell 2 as a serving cell of the HNB GW B, and the HNB C records the Cell 1 as a serving cell of the HNB GW B, the flow specifically includes the following steps:

Step 800: the HNB A selects a service management system (HMS); after verifying that a service can be provided for the HNB A, the HMS configures necessary parameters for the HNB A, the configured parameters including a cell ID and a Primary Scrambling Code (PSC) of the HNB A, and so on; meanwhile the HMS specifies a gateway HNB GW B with which the HNB needs to be connected for the HNB A, for example, an IP address of the HNB GW B, which is used for establishing an Iuh interface. If the HNB A can establish a direct interface with the HNB GW B, the HMS needs to configure transport layer information needed to establish a direct interface at the same time, for example, the IP address of the HNB GW B, which is used for establishing an Iur interface;

in Step 800, the verification is an authentication of identity according to geographical information provided by the HNB; the verification is implemented by technical means easily obtained or commonly used by those skilled in the art, thus no detailed description is needed here;

Step 801: the HNB A registers with the HNB GW B; during the registration process, the HNB A provides information of itself to the HNB GW B, such as a cell ID and geographical information; the HNB GW B allocates an RNC identifier to the HNB A; the HNB A finishes the establishment of a cell and provides a service for UE;

Step 802: the HNB A establishes an SCTP or Signaling Control Connection Part (SCCP) connection with the HNB GW B according to the IP address of the HNB GW B, which is used for establishing a direct interface obtained in step 800, and sends the HNB GW B a message for instructing the HNB GW B to establish a direct interface between the HNB A and the HNB GW B, wherein the message can be an HNBAP message or a direct interface control plane message;

the message for instructing the HNB GW B to establish a direct interface between the HNB A and the HNB GW B includes information of a serving cell, that is, information of a cell established by the HNB A, including an ECGI and a PSC of the cell, and further includes the geographical information of the HNB A;

step 803: in the condition that the HNB GW B does not accept the direct interface establishment wanted by the HNB A, the HNB GW B returns a direct interface establishment failure message; otherwise, the HNB GW B returns a direct interface establishment response message, and optionally returns information of all HNB cells managed by HNB GW B to the HNB A through a serving cell information option in the direct interface establishment response message, or determines neighboring cell information of the HNB A according to the geographical information and the CSG attribute of the HNB A and then returns information of a cell geographically adjacent to the HNB A to the HNB A;

step 804: after the HNB A establishes a direct interface with the HNB GW B, provided that the HNB C is electrified and started, wherein the geographical location of the HNB C is adjacent to that of the HNB A. The HNB C selects an HMS; after the HMS verifies that a service can be provided for the HNB C, the HMS configures necessary parameters for the HNB C, the configured parameters including a cell ID and a PSC of the HNB C, and so on; meanwhile the HMS specifies a gateway HNB GW B with which the HNB C is needed to be connected for the HNB C, for example, an IP address of the HNB GW B, which is used for establishing an Iuh interface. If the HNB C can establish a direct interface with the HNB GW B, the HMS needs to configure transport layer information needed to establish a direct interface at the same time, for example, the IP address of the HNB GW B, which is used for establishing an Iur interface;

Step 805: the HNB C registers with the HNB GW B; during the registration process, the HNB C provides information of itself such as a cell ID and geographical information to the HNB GW B; the HNB GW B allocates an RNC identifier for the HNB C; the HNB C finishes the establishment of a cell and provides a service for UE;

Step 806: the HNB C establishes an SCTP or SCCP connection with the HNB GW B according to the IP address of the HNB GW B which is used for establishing a direct interface obtained in Step 800, and sends the HNB GW B a message for instructing the HNB GW B to establish a direct interface between the HNB C and the HNB GW B, wherein the message can be an HNBAP message or a direct interface control plane message;

the message for instructing the HNB GW B to establish a direct interface between the HNB C and the HNB GW B includes information of a serving cell, that is, information of a cell established by the HNB C, including an ECGI and a PSC of the cell, and further includes the geographical information of the HNB C itself;

step 807: if the HNB GW B does not accept the direct interface establishment wanted by the HNB, the HNB GW B returns a direct interface establishment failure message; otherwise, the HNB GW B returns a direct interface establishment response message. Since the geographical locations of the HNB A and the HNB C are adjacent, through the direct interface establishment response message, the HNB GW B returns the information of the cell established by the HNB A obtained in step 803, as the information of the serving cell, to the HNB C; the direct interface establishment response message can further include the information of all HNB cells managed by the HNB GW B, or the information of other neighboring cells selected according to the geographical information of the HNB C;

Step 808: the HNB GW B sends a configuration update message to the HNB A, to notify the HNB A to add information of a cell established by the HeNB C which serves as a serving cell managed by the HNB GW, wherein the message can be an HNBAP message or a direct interface control plane message.

Then, Step 809 to Step 816 are similar to the flow shown in FIG. 7, only the network element type and the interface message are different. Through Step 809 to Step 816, the handover preparation process of the direct interface is completed; as shown in FIG. 8, the flow includes the following steps:

Step 809: provided that UE accesses the Cell1 established by the HNB A and is in a connection status. Due to the changes in mobility or wireless signal or the like, the HNB A needs to switch the UE to a target cell Cell 2 and determines that the Cell 2 is a serving cell of the HNB GW B;

Step 810: the HNB A sends an enhanced relocation request message to the HNB GW B through a direct interface, includes the ID of the Cell 2 which serves as a target cell ID in the enhanced relocation request message, and allocates a signalling connection identifier of the UE on this direct interface, for example, Transaction id 1;

step 811: after receiving the enhanced relocation request message from the HNB A direct interface, the HNB GW B determines that the target base station is the HNB C according to the target cell ID in the message, that is, the ID of the Cell 2, and information carried when the HNB C establishes an Iuh interface and a direct interface; and then the HNB GW B reallocates a signaling connection identifier such as Transaction id 2 to the UE, and records a mapping relationship between the Transaction id 1 and the Transaction id 2;

Step 812: the HNB GW B sends the enhanced relocation request message to the HNB C through the direct interface between the HNB C and the HNB GW B, and makes the ID of the Cell 2 serving as the target cell ID and the Transaction id serving as a signaling connection identifier included in the message.

Step 813: after receiving the enhanced relocation request message from the HNB GW B direct interface, the HNB C allocates resources. If the HNB C allows the handover of the UE, the HNB C returns an enhanced relocation request response message to the HNB GW B and makes the Transaction id 2 serving as the signaling connection identifier included in the message;

Step 814: after receiving the enhanced relocation request response message from the HNB C direct interface, the HNB GW B is mapped to the Transaction id 1 according to the signaling connection identifier Transaction id 2 included in the message and determines that the HNB which initiates the relocation is the HNB A;

Step 815: the HNB GW B sends the HNB A an enhanced relocation request response message, which includes the Transaction id 1 serving as a signaling connection identifier;

step 816: after receiving the enhanced relocation request response message from the HNB GW B, the HNB A completes a relocation preparation process and continues to perform a reallocation process at an air interface.

For other UE-related direct interface flows initiated from the source HNB, the HNB GW B needs to determine a target HNB of the flow and a target HNB according to cell information or a signaling connection number in a message and forwards the message to the target HNB.

Then, Step 817 to Step 819 are similar to the steps shown in FIG. 5, only the network element type and the interface message are different. Through Step 817 to Step 819, the update process of a direct interface between HNBs is implemented; as shown in FIG. 8, the flow includes the following steps:

Step 817: provided that the information of the Cell 1 established by the HNB A has changed, for example, the information such as the cell ID or PSC has changed, then the HNB A notifies the HNB GW B through a configuration update message;

step 818: the HNB GW B determines that the information of the HNB A is needed to be notified to the HNB C, wherein the determination can be made based on whether the HNB C has similar geographical information to that of the HNB A. The HNB GW B sends the HNB C a configuration update message which includes updated information of the Cell 1 established the HNB A, wherein the updated information is obtained by updating the information of the serving cell of the HNB GW B itself;

Step 819: after receiving the configuration update message, the HNB C updates information of the direct interface between the HNB C itself and the HNB GW B according to the information included in the message; if the update succeeds, the HNB C returns a configuration update response message to the HNB GW B; otherwise, the HNB C returns a configuration update failure message.

Then, Step 820 to Step 832 are similar to the steps shown in FIG. 6, only the network element type and the interface message are different. Through Step 820 to Step 832, the deletion process of a direct interface between HNBs is described; as shown in FIG. 8, the flow includes the following steps:

Step 820: if the update carried out by the HNB C succeeds, the HNB GW B returns a configuration update response message to the HNB A; otherwise, the HNB GW B returns a configuration update failure message;

Step 821: after a period of time, the HNB A terminates service, for example, being offline or powered down; and the HNB GW B detects a disconnection from the HNB A through underlying link protection;

Step 822: the HNB GW B instructs the HNB C through a configuration update message to delete the information of the Cell 1 established by the HNB A.

step 823: after receiving the configuration update message, the HNB C updates the information of the direct interface between the HNB C itself and the HNB GW B according to the information included in the message; if the update succeeds, the HNB C returns a configuration update response message to the HNB GW B; otherwise, the HNB C returns a configuration update failure message.

Figure 9:
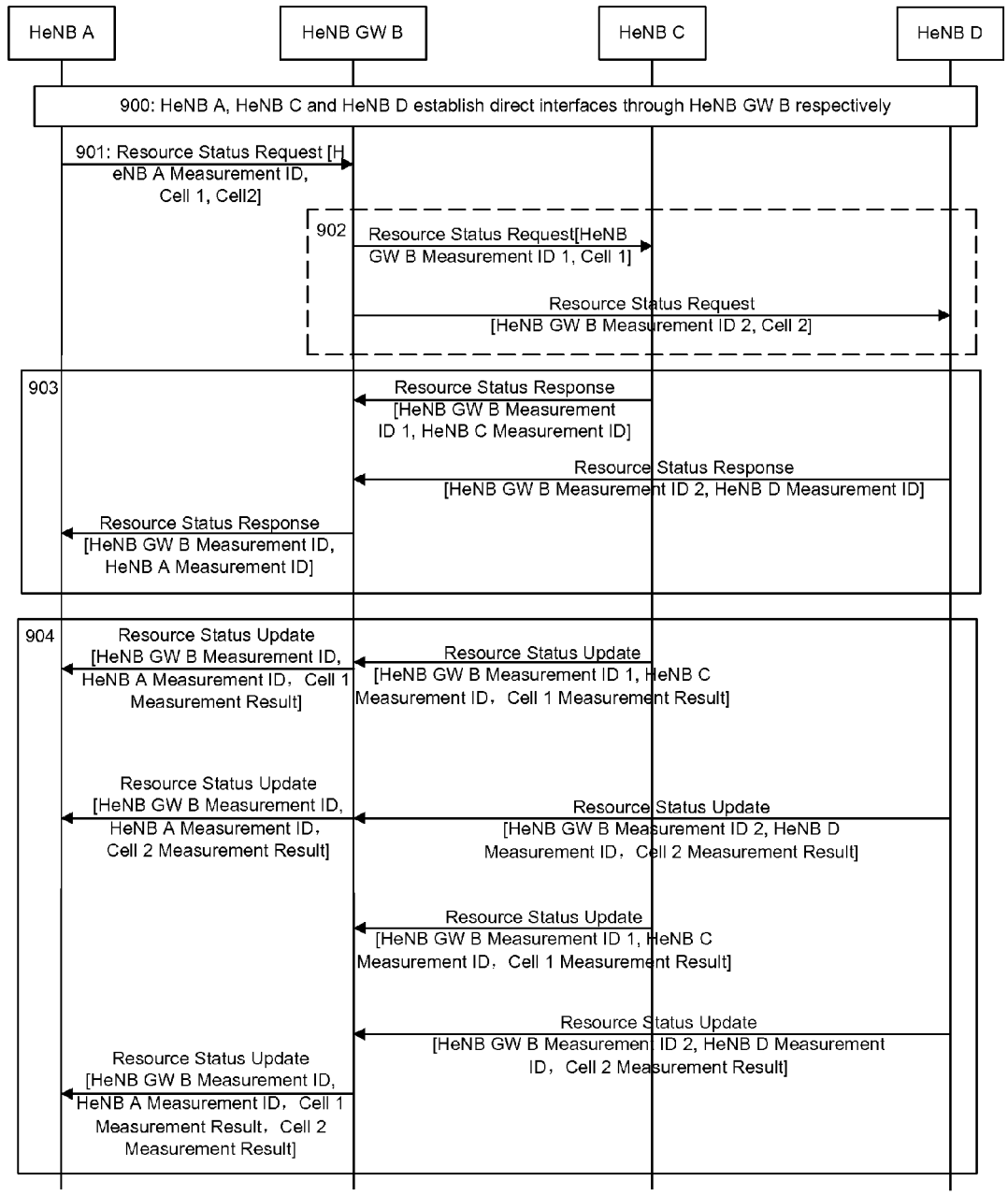
FIG. 9 shows a diagram of executing a public UE flow between HeNB direct interfaces through an HeNB GW according to the disclosure.

FIG. 9 shows a diagram of performing a public UE flow between HeNB direct interfaces through an HeNB GW according to the disclosure. Provided that access network nodes are HeNB A, HeNB C and HeNB D respectively, and the HeNB A, HeNB C and HeNB D are connected to an MME through an HeNB GW B; wherein a cell established by the HeNB C is Cell 1 and a cell established by the HeNB D is Cell 2; as shown in FIG. 9, the flow includes the following steps:

Step 900: the steps shown in FIG. 4 are applied; the HeNB A, the HeNB C and the HeNB D establish direct interfaces through the HeNB GW B respectively;

Step 901: provided the HeNB A determines that it is needed to exchange resources with an adjacent base station and perform load balance according to a load status of the established cell, the HeNB A sends a Resource Status Request message to the HeNB GW B, wherein the message includes an allocated HeNB A Measurement ID and specifies that it is needed to report the resources of the Cell1 and the Cell 2;

Step 902: the HeNB GW B determines that the Cell 1 belongs to the HeNB C and the Cell 2 belongs to the HeNB D according to information obtained when establishing an S1 interface or a direct interface with the HeNB C and the HeNB D. The HeNB GW B allocates an HeNB GW B Measurement ID for the resource interaction flow;

the HeNB GW B forwards Resource Status Requests to the HeNB C and the HeNB D respectively, wherein the signaling forwarded to the HeNB C includes HeNB GW B Measurement ID 1 and specifies that it is needed to report the resources of the Cell 1; and the signaling forwarded to the HeNB D includes HeNB GW B Measurement ID 2 and specifies that it is needed to report the resources of the Cell 2.

The HeNB GW B records mapping relationships between (HeNB A Measurement ID, HeNB GW B Measurement ID) and the HeNB GW B Measurement ID 1 as well as the HeNB GW B Measurement ID 2;

Step 903: the HeNB C returns a Resource Status Response message, which includes an allocated HeNB C Measurement ID and the HeNB GW B Measurement ID 1;

the HeNB D returns a Resource Status Response, which includes an allocated HeNB D Measurement ID and includes the HeNB GW B Measurement ID 2;

the HeNB GW B returns a Resource Status Response to the HeNB A, the Resource Status Response including the HeNB A Measurement ID and the HeNB GW B Measurement ID; meanwhile, the HeNB GW B records that (HeNB A Measurement ID, HeNB GW B Measurement ID) is simultaneously mapped to the resource interaction flows identified by the (HeNB GW B Measurement ID 1, HeNB C Measurement ID) and the (HeNB GW B Measurement ID 2, HeNB D Measurement ID);

and Step 904: the HeNB C periodically reports a resource status of the Cell 1 through a Resource Status Update message which includes an interaction flow identifier (HeNB GW B Measurement ID 1, HeNB C Measurement ID). After receiving the message, the HeNB GW B replaces the identifier with (HeNB GW B Measurement ID 1, HeNB C Measurement ID) and sends it to the HeNB A.

the HeNB D periodically reports a resource status of the Cell 2 through a Resource Status Update message which includes an interaction flow identifier (HeNB GW B Measurement ID 2, HeNB D Measurement ID). After receiving the signaling, the HeNB GW B replaces the identifier with (HeNB GW B Measurement ID 1, HeNB C Measurement ID) and sends it to the HeNB A.

The HeNB GW also can combine the Resource Status Update messages coming from the HeNB C and the HeNB D into one signaling and send it to the HeNB A.

Through the process above, the resource status report flow on the direct interface is completed.

Based on the method above, the disclosure also provides a system for implementing a direct interface between access network nodes, at least including a proxy node, one or more access network nodes; wherein the access network node is configured to establish a direct interface with the proxy node and to exchange information with an access network node managed by the proxy node through the established direct interface;

wherein the access network node is an HeNB, the proxy node is an HeNB GW and the direct interface is an X2 interface or a newly added direct interface; or, the access network node is an HNB, the proxy node is an HNB GW and the direct interface is an Iur interface or a newly added direct interface.

The system further includes a service management system, at this moment, the access network node is specifically configured to pass verification performed by a service management system and establish a direct interface with the proxy node using obtained transport layer information; and the service management system is configured to configure information of the proxy node for the access network node, wherein the information includes transport layer information of the proxy node establishing the direct interface.

When cell information of the access network node changes, the access network node is specifically configured to notify the proxy node of changed cell information; and the proxy node is specifically configured to notify other access network nodes managed by the proxy node of the obtained changed cell information as serving cell information.

The access network nodes obtaining the changed cell information are further configured, after a successful update, to respond the access network node with an update success through the proxy node.

When the proxy node notifies other access network nodes of the obtained changed information of the access network node, the other access network nodes refer to:

nodes with similar geographic information to that of the access network node with information changed, or nodes with the same CSG attribute, or nodes with similar geographic information and the same CSG attribute.

When the access network node terminates a service, the proxy node is specifically configured, after detecting a disconnection from the access network node through underlying link protection, to instruct other access network nodes managed by the proxy node itself to delete stored cell information of the access network node; and the other access network nodes managed by the proxy node are configured, after deleting the stored cell information successfully, to respond the proxy node with a deletion success.

When UE accessing the access network node needs to perform handover, the access network node is specifically configured, when determining that a target cell is a serving cell of the proxy node, to request handover from the proxy node through the direct interface;

the proxy node is specifically configured to reallocate a signaling connection identifier to the UE and send a handover request to a target access network node where the target cell is located through the direct interface; and the target access network node is configured to return a handover response to the source access network node where the handover occurs via the proxy node through the direct interface.

When the UE accessing the access network node needs to perform handover, the target access network node is further configured to notify a core network to update information of a user plane channel and information of an access network element, and notify the source access network node to release a context of the UE through the proxy node.

When the access network node needs to perform load balance, the access network node is specifically configured to, through the direct interface, request reporting of cell resources from the proxy node; and the proxy node is specifically configured, after determining a corresponding access network node to which a cell to be reported belongs, to forward a resource status request to the corresponding access network node through the direct interface, and to return resource conditions of each cell to the access network node through the direct interface.

The above are only the preferred embodiments of the disclosure and not intended to limit the protection scope of the disclosure. Any modification, equivalent substitute and improvement made within the spirit and principle of the disclosure are deemed to be included within the protection scope of the disclosure.

The invention claimed is:

1. A method for implementing a direct interface between access network nodes, comprising:
   establishing, by an access network node, a direct interface with a proxy node; and
   performing, by the access network node, information exchange with an access network node managed by the proxy node through the established direct interface;
   wherein when the access network node terminates a service, the information exchange comprises:
   after the proxy node detects a disconnection from the access network node through underlying link protection, instructing, by the proxy node other access network nodes managed by the proxy node itself to delete stored cell information of the access network node; and
   after the other access network nodes managed by the proxy node delete the stored cell information successfully, responding, by the other access network nodes, the proxy node with a deletion success.

2. The method according to claim 1, wherein the establishing by an access network node a direct interface with a proxy node comprises:
   after the access network node passes verification performed by a service management system, configuring, by the service management system, information of the proxy node for the access network node, wherein the information includes transport layer information of the proxy node establishing the direct interface; and
   establishing, by the access network node, the direct interface with the proxy node using the transport layer information.

3. The method according to claim 2, wherein the transport layer information is an IP address of the proxy node, which is used for establishing the direct interface.

4. The method according to claim 1, wherein the access network node is a Home Evolved NodeB (HeNB), the proxy node is a Home Evolved NodeB Gateway (HeNB GW) and the direct interface is an X2 interface or a newly added direct interface; or
   the access network node is a Home NodeB (HNB), the proxy node is a Home NodeB Gateway (HNB GW) and the direct interface is an Iur interface or a newly added direct interface.

5. The method according to claim 1, wherein when cell information of the access network node changes, the information exchange comprises:
   notifying, by the access network node, the proxy node of changed cell information; and
   notifying, by the proxy node, other access network nodes managed by the proxy node of the changed cell information obtained.

6. The method according to claim 5, wherein when the proxy node notifies other access network nodes of the changed cell information, the other access network nodes refer to: nodes with similar geographic information to that of the access network node, or nodes with a same Closed Subscriber Group (CSG) attribute, or nodes with similar geographic information and a same CSG attribute.

7. The method according to claim 5, further comprising:
   after the other access network nodes obtaining the changed cell information makes an update successfully, responding, by the other access network nodes, the access network node with an update success through the proxy node.

8. The method according to claim 1, wherein when User Equipment (UE) accessing the access network node needs to perform handover, the information exchange comprises:
   when the access network node determines that a target cell to which the UE is to be switched is a serving cell of the proxy node, requesting, by the access network node, handover from the proxy node through the direct interface;
   reallocating, by the proxy node, a signaling connection identifier to the UE, and sending, by the proxy node, a handover request to a target access network node where the target cell is located through the direct interface; and
   returning, by the target access network node, a handover response to the access network node where the handover occurs via the proxy node through the direct interface.

9. The method according to claim 8, wherein when the UE accessing the access network node needs to perform handover, the information exchange further comprises:
   notifying, by the target access network node, a core network to update information of a user plane channel and information of an access network element, and notifying, by the target access network node, the access network node where the handover occurs to release a context of the UE through the proxy node.

10. The method according to claim 1, wherein when the access network node needs to perform load balance, the information exchanges comprises:
    requesting, by the access network node, reporting of cell resources from the proxy node through the direct interface;
    after the proxy node determines a corresponding access network node to which a cell to be reported belongs, forwarding, by the proxy node, a resource status request to the corresponding access network node through the direct interface; and
    returning, by the proxy node, resource conditions of each cell to the access network node through the direct interface.

11. A system for implementing a direct interface between access network nodes, at least comprising a proxy node, and one or more access network nodes; wherein the access network node is configured to establish a direct interface with the proxy node and to exchange information with an access network node managed by the proxy node through the established direct interface;
    wherein when the access network node terminates a service,
    the proxy node is configured, after detecting a disconnection from the access network node through underlying link protection, to instruct other access network nodes managed by the proxy node itself to delete stored cell information of the access network node; and
    the other access network nodes managed by the proxy node are configured, after deleting the stored cell information successfully, to respond the proxy node with a deletion success.

12. The system according to claim 11, further comprising a service management system;
    the access network node is configured to establish the direct interface with the proxy node using obtained transport layer information; and
    the service management system is configured to verify the access network node and to configure information of the proxy node for the access network node, wherein the information includes transport layer information of the proxy node for establishing the direct interface.

13. The system according to claim 12, wherein the other access network nodes obtaining the changed cell information are further configured, after a successful update, to respond the access network node with an update success through the proxy node.

14. The system according to claim 13, wherein when the proxy node notifies other access network nodes of obtained changed information of the access network node, the other access network nodes refer to:
nodes with similar geographic information to that of the access network node, or nodes with a same Closed Subscriber Group (CSG) attribute, or nodes with similar geographic information and a same CSG attribute.

15. The system according to claim 11, wherein when cell information of the access network node changes,
the access network node is configured to notify the proxy node of changed cell information; and
the proxy node is configured to notify other access network nodes managed by the proxy node of the changed cell information obtained.

16. The system according to claim 11, wherein when UE accessing the access network node needs to perform handover,
the access network node is configured, when determining that a target cell to which the UE is to be switched is a serving cell of the proxy node, to request handover from the proxy node through the direct interface;
the proxy node is configured to reallocate a signaling connection identifier to the UE and to send a handover request to a target access network node where the target cell is located through the direct interface; and
the target access network node is configured to return a handover response to the access network node where the handover occurs via the proxy node through the direct interface.

17. The system according to claim 16, wherein when the UE accessing the access network node needs to perform handover,
the target access network node is further configured to notify a core network to update information of a user plane channel and information of an access network element and to notify, through the proxy node, the access network node where the handover occurs to release a context of the UE.

18. The system according to claim 11, wherein when the access network node needs to perform load balance,
the access network node is configured to, through the direct interface, request reporting of cell resources from the proxy node; and
the proxy node is configured, after determining a corresponding access network node to which a cell to be reported belongs, to forward a resource status request to the corresponding access network node through the direct interface, and to return resource conditions of each cell to the access network node through the direct interface.

19. The system according to claim 11, wherein the access network node is a Home NodeB (HNB), the proxy node is a Home NodeB Gateway (HNB GW) and the direct interface is an X2 interface or a newly added direct interface; or
the access network node is a Home NodeB (HNB), the proxy node is an HNB GW and the direct interface is an Iur interface or a newly added direct interface.

\* \* \* \* \*